United States Patent Office.

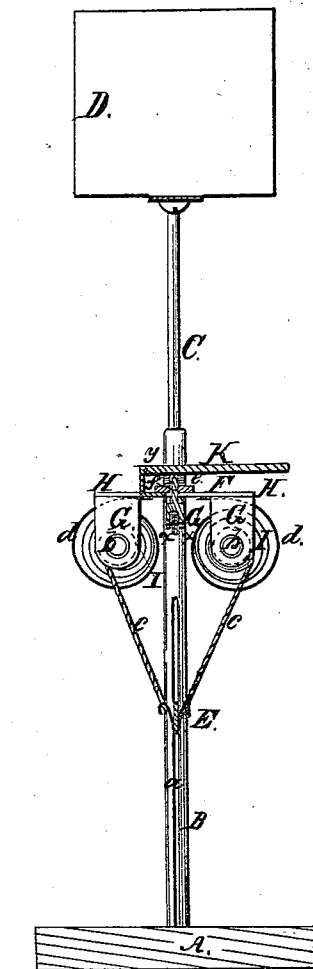
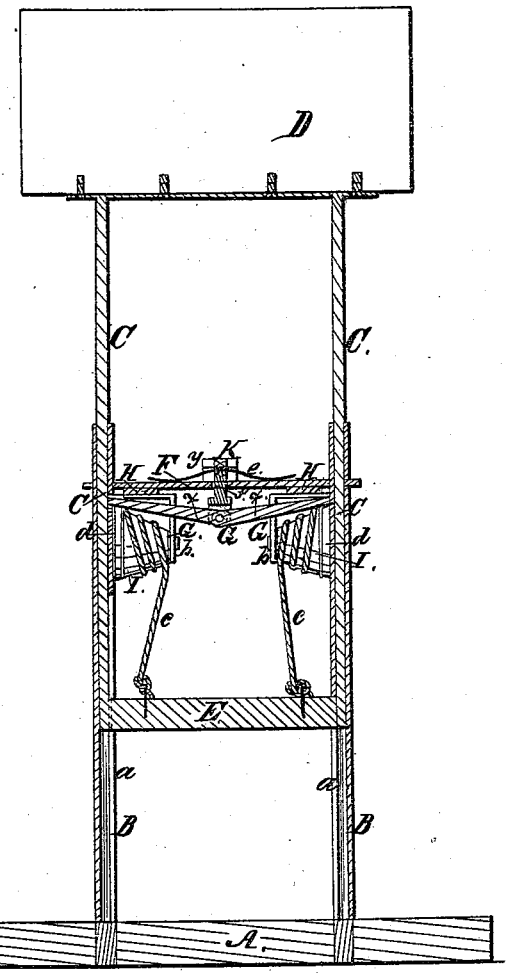

JOHN A. WHIPPLE, OF BOSTON, MASSACHUSETTS.

CAMERA-STAND.

Specification forming part of Letters Patent No. 39,602, dated August 18, 1863.

*To all whom it may concern:*

Be it known that I, JOHN A. WHIPPLE, of Boston, in the county of Suffolk and State of Massachusetts, have invented an Improved Camera-Stand; and I do hereby declare that the following, taken in connection with the drawings which accompany and form part of this specification, is a description of my invention sufficient to enable these skilled in the art to practice it.

My invention consists in a new manner of applying a potographic camera to its stand so as to render it light, portable, and of easy adjustability.

Figure 1 of the drawings represents a vertical central cross-section of the stand; Fig. 2, a vertical, central, and longitudinal section of it.

A denotes the base of the stand, having erected upon it two stationary hollow pillars or tubes, B, into which two rods, C, extend, the camera D being fixed upon the tops of these rods. The rods are so applied as to slide freely up and down in the tubes B. They are connected at their lower ends by a cross-bar, E, which works in vertical grooves $a$ in the tubes B. Another cross-bar, F, connects the tubes B at or near their tops. Bearings or plates G G depend from the outer ends of two arms, H H, affixed to the opposite ends of the cross bar F, in which bearings shafts $b\ b$ of conical or fusee pulleys or arms I I rotate. A cord, C, extends from the lower cross-bar, E, to each of these drums, the cord winding into a groove cut in the perimeter of the drum, similarly to the winding of the chain on a watch-fusee. One end of a helical spring, $d$, is applied to the outer end of each shaft $b$, its other end being fastened to the bearing-plate. Depression of the bar E unwinds the cords $c$ and coils the springs $d$, and the springs are made of sufficient power to overcome the weight of the camera on the rods C and bar E, and produce its upward movement to or about to the extent of wind of the cords on the drums. Arrest of this movement is produced by $a$ break mechanism as follows: A spring, $e$, lies upon the top of the bar F, as seen in the drawings, from the center of which a pin, $f$, extends down through the plate F, and connects the spring to a toggle-joint, G, the outer ends of the arms $x\ x$ forming said joint, extending through the tubes B B and impinging against the rods C C. A hand-lever, K, jointed at $y$, rests on the top of the spring $e$.

The operation of the invention is as follows: The operator having fixed the "sitter" or object to be photographed in position, and carried the stand to its proper place, the camera being supposed to be below the required plane, he applies his hand to the lever K and depresses the spring $e$ and pin $f$, which, pushing down the toggle-levers, draws their ends away from the rod C. The rods, being released from this pressure, are acted upon by the springs $d$, and caused to have and to impart to the camera a regular and progressive upward movement. As the camera comes into a desirable plane, the hand lever is released, when the spring $e$ causes the upward movement of the toggle-joint, and forces the arms $x\ x$ against the rods C C, instantaneously arresting the upward movement of the camera. By employment of the fussee wheels and springs the variable power of the springs causes a regular and constant rise of the camera, and by the use of springs instead of weights the stand is rendered very light and easy of movement from and into position, all jar from lateral movement of weights is avoided, and I add very greatly to the quickness and efficiency of the operation by having a camera-stand of so easy and perfect movement and adjustability. Depression of the camera is produced by withdrawing the pressure of the toggle-arms on the rods C and applying the hand to the camera, when it is readily lowered to any desirable extent.

Instead of applying the brake mechanism, as described, thumb-screws may be sometimes used, though I generally prefer the method shown when the camera is supported on two pillars.

I claim—

Elevating and arresting the camera by the mechanism arranged and operating substantially as herein described.

JOHN A. WHIPPLE.

Witnesses:
FRED. MILLS.
FRANCIS GOULD.